United States Patent [19]

Olashaw et al.

[11] 4,001,653
[45] Jan. 4, 1977

[54] APPARATUS FOR MECHANICALLY ASSISTING THE INSTALLATION AND REMOVAL OF AN ELECTRICAL DEVICE WITH RESPECT TO A SWITCHBOARD

[75] Inventors: William F. Olashaw, Plainville; Frederick D. Kaufhold, Forestville, both of Conn.

[73] Assignee: General Electric Company, New York, N.Y.

[22] Filed: Mar. 28, 1974

[21] Appl. No.: 455,639

[52] U.S. Cl. .............................. 317/119; 339/92 M
[51] Int. Cl.² ........................................ H02B 1/04
[58] Field of Search .......... 317/112, 119, 120, 118; 339/64 R, 64 M, 92 R, 92 M, 255 P; 200/293, 294

[56] References Cited

UNITED STATES PATENTS

| | | | |
|---|---|---|---|
| 2,343,675 | 3/1944 | Kenyon | 339/92 M |
| 2,845,604 | 7/1958 | Jackson | 339/92 M |
| 3,043,925 | 7/1962 | Wilson | 339/92 M |
| 3,474,206 | 10/1969 | Gryctko | 317/119 |
| 3,546,411 | 12/1970 | Kobayashi | 200/294 |
| 3,596,142 | 7/1971 | Campanini | 317/119 |
| 3,718,887 | 2/1973 | Solomon | 339/92 M |

*Primary Examiner*—Gerald P. Tolin
*Attorney, Agent, or Firm*—Robert A. Cahill; Walter C. Bernkopf; Frank L. Neuhauser

[57] ABSTRACT

A mechanical assist, incorporated in each of one line and one load terminal electric connection of a multipole device to a switchboard, comprises a bolted joint wherein the bolt, carried by the device, is constrained against endwise movement relative thereto. The other line and load terminal connections are plug-in types. Rotation of the bolt in each assist produces movement of the device relative to the switchboard, thereby facilitating electrical connection and disconnection, as well as mounting and dismounting thereof. An insulative torque coupler is incorporated in the line terminal assist to facilitate connection and disconnection while the switchboard is live.

16 Claims, 3 Drawing Figures

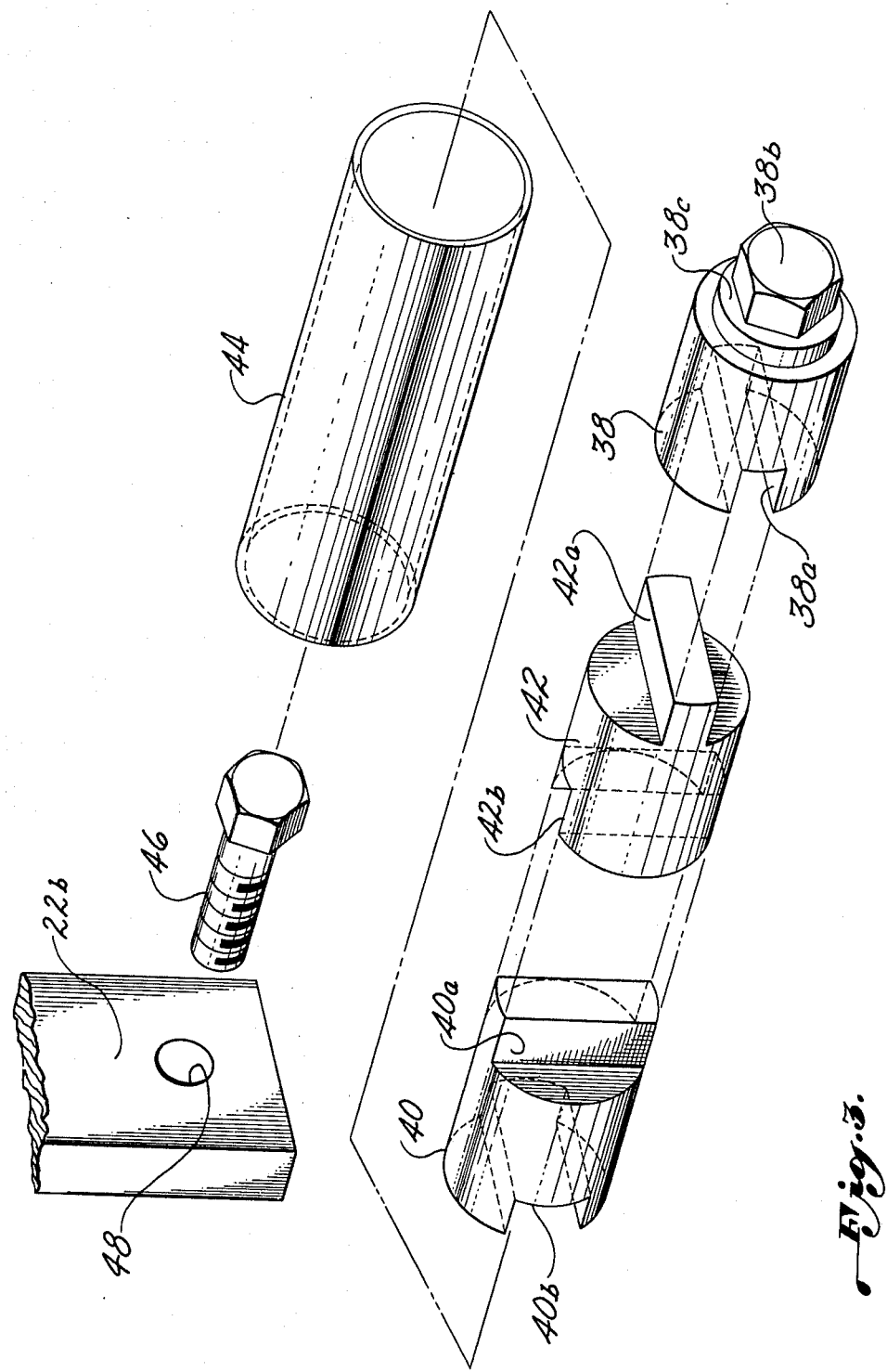

APPARATUS FOR MECHANICALLY ASSISTING THE INSTALLATION AND REMOVAL OF AN ELECTRICAL DEVICE WITH RESPECT TO A SWITCHBOARD

BACKGROUND OF THE INVENTION

The physical mounting and electrical connection of large and thus relatively heavy electrical devices, such as circuit interrupting devices, to switchboards is a rather difficult task. In some installations, physical mounting and electrical connection are commonly obtained using bolted joints at the device line terminals. In this way, the device is coincidentally supported by and electrically connected to the buswork of the switchboard. While this arrangement is quite effective in achieving both functions, the mounting and dismounting of the device is not particularly convenient. An additional, and quite significant disadvantage of bolted line terminals is that mounting and dismounting of the device is quite hazardous if performed while the switchboard is live. In many situations, it is impractical or at least undesirable to de-energize the switchboard, and thus the electricians must use insulative gloves and/or special tools.

To reduce the hazards of working with live switchboards, devices are provided with plug-in or stab-type terminal connectors which do not require manipulation during mounting and dismounting of the device. However, stab connectors are not capable of physically supporting large devices, which therefore must be somehow separately mounted to and supported by the switchboard. The separation of the electrical connection and physical mounting function renders this type of installation only somewhat more convenient to the electrician. Moreover, stab connections, particularly those having high current ratings, typically require considerable exertion by the electrician to effect connection and disconnection. This can be particularly unfortunate during disconnection, since the sudden release of stab connections can throw the electrician off balance, raising the possibility of personal injury, and damage to the device.

To alleviate this problem, special hand tools have been devised to pry the device from the switchboard to separate the stab connectors once the physical connection thereto has been broken. Alternatively, mechanical assists or so-called "racking mechanisms", such as disclosed in U.S. Pat. No. 3,142,003, have been devised for aiding the electrician in safely installing and removing devices from electrical switchboards. It will be appreciated that such prior art mechanical assist mechanisms, though desirable, add measurably to the cost of the equipment. A somewhat more practical arrangement has been proposed in U.S. Pat. No. 3,546,411 using a jackscrew approach. However, the jackscrews are physically disassociated from the device terminals.

It is accordingly an object of the present invention to provide an improved mechanical assist for facilitating the installation and removal of plug-in type electrical devices with respect to electrical panel assemblies.

An additional object of the present invention is to provide a mechanical assist of the above character which is incorporated in several of the electrical terminals of the device itself.

Yet another object of the present invention is to provide a mechanical assist of the above character which further serves the dual function of terminal electrical connection and physical support for the device.

Still another object of the invention is to provide a mechanical assist of the above character, which is readily compatible with existing designs for electrical devices and panel assemblies.

A further object is to provide a mechanical assist of the above character which is simple, inexpensive, reliable, and safe.

A still further object of the invention is to provide a multi-pole electrical device incorporating plural mechanical assists of the above character.

Other objects will in part be obvious and in part appear hereinafter.

SUMMARY OF THE INVENTION

In accordance with the present invention, there is provided apparatus for mechanically assisting the installation and removal of a plug-in device, such as a circuit interrupter, with respect to an electrical switchboard. In addition to mechanical assistance, the apparatus of the invention provides electrical terminal connection and physical mounting of the circuit interrupter to the switchboard. It is a signal feature of the invention that these manifold functions are effectuated concomitantly.

More specifically, the present invention contemplates substituting for one of the stab line terminal connectors and one of the stab load terminal connectors of a multi-pole, plug-in device bolted terminal connector parts, where the bolts, though freely rotatable, are constrained against endwise movement with respect to the device. Preferably the center pole line and load terminals of the device are so equipped. Bolted connector parts having tapped bores for threadedly receiving these bolts are fixedly mounted by the corresponding switchboard terminals. Stab connectors are also mounted by the switchboard for mating electrical engagement with the stab line and load terminal connectors carried by the device.

To install the device in the switchboard, the bolts are rotated to advance them into the connector tapped bores, thereby drawing the device toward the switchboard, while at the same time mating the device and switchboard stab connectors. When the bolts are turned down tight, the bolted and stab terminal connections are completed; the former also can advantageously serve to physically mount or, at the very least, secure the device in its fully installed position with respect to the switchboard. To retract or remove the device, the bolts are unscrewed to move the device away from its installed position and, at the same time separate the device and switchboard stab connectors.

As an additional feature of the invention, an insulative torque coupler is incorporated in at least the bolted line terminal joint such that the bolt can be safely manipulated while the switchboard is live. More specifically, the torque coupler comprises a headed metallic part, a metallic socketed part and an intermediate insulative part keyed to rotatably couple the two metallic parts. The three parts are encased in an insulative sleeve and confined in a line terminal recess of the device. The socketed part engages the head of the bolt, while a wrench is used to torque the headed part to rotate the bolt. Since the metallic parts are electrically isolated from each other by the intervening insulative part, contact with the headed part presents no danger of electrocution. Thus, the apparatus of the invention can be safely manipulated to install and remove a device while the switchboard remains energized.

The invention accordingly comprises the features of construction and arrangement of parts which will be exemplified in the construction hereinafter set forth, and the scope of the invention will be indicated in the claims.

DESCRIPTION OF THE DRAWING

For a fuller understanding of the nature and objects of the invention, reference should be had to the following detailed description taken in connection with the accompanying drawing in which:

FIG. 3 is an exploded perspective view of that portion of the mechanical assist of the invention as accommodated at the center pole line terminal of the circuit interrupting device.

Corresponding reference numerals refer to like parts throughout the several views of the drawings.

DETAILED DESCRIPTION

Figure 1:
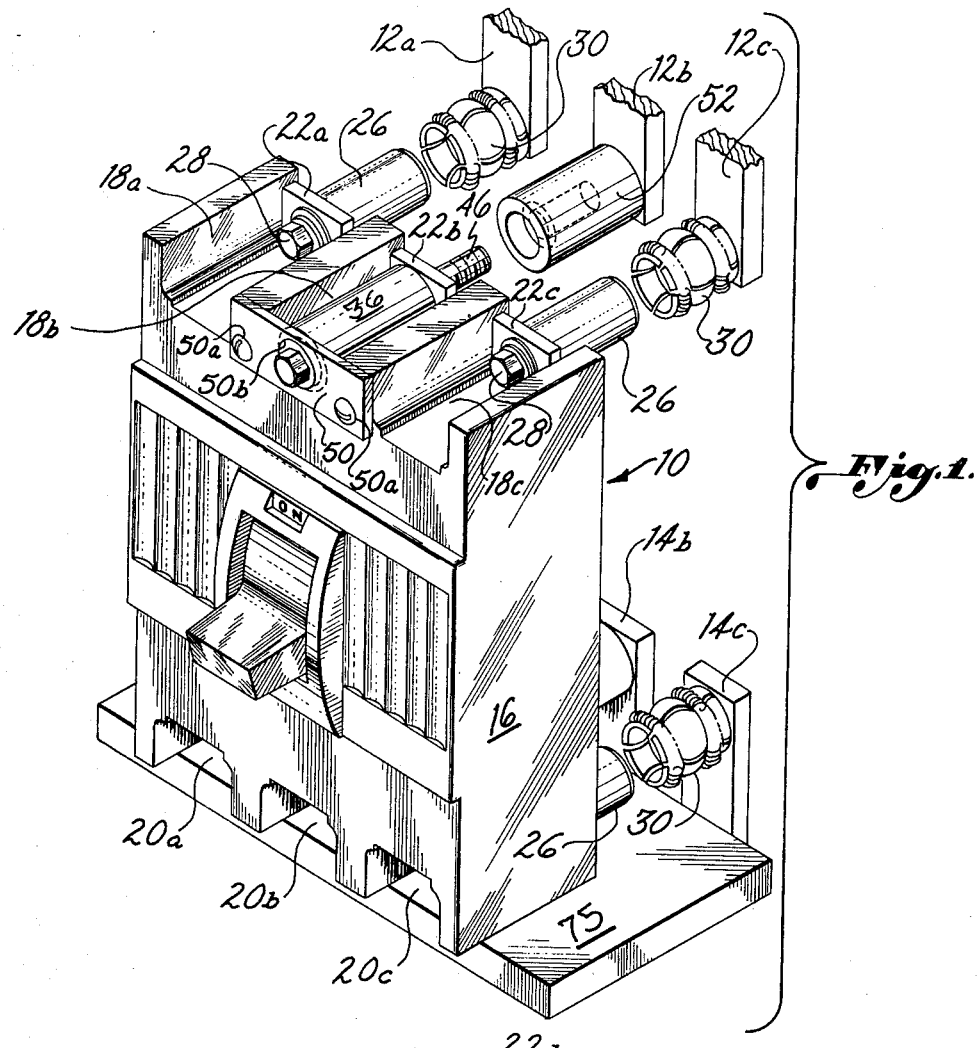
FIG. 1 is a perspective view of a circuit interrupting device and a portion of an electrical switchboard equipped with the mechanical assist of the present invention.

Referring to the drawings, a circuit interrupting device, for example a circuit breaker as generally indicated at 10, is illustrated in electrically disconnected relation to switchboard terminals provided by line bus 12A, 12B 12C and load bus 14A (not shown), 14B, 14C rigidly mounted in an industrial switchboard. The circuit breaker 10 is enclosed in a molded case 16 which is formed to provide line terminal recesses 18A, 18B, 18C at its upper end and load terminal recesses 20A, 20B, 20C at its lower end in the orientation illustrated. Adjacent the back side of the circuit breaker, line terminals 22A, 22B, 22C emanate from the interior of the molded case into these line terminal recesses. While obscured in FIG. 1, it will be understood that load terminals, respectively electrically associated with each of the line terminals, emanated from the interior of the circuit breaker case 16 into respective load terminal recesses 20A, 20B, 20C. This structure is illustrated in FIG. 2, wherein the center pole or B phase load terminal 24B extends into load terminal recess 20B adjacent the rearward end thereof. The structure of circuit breaker 10 thus far described is conventional.

Figures 2, 2A:
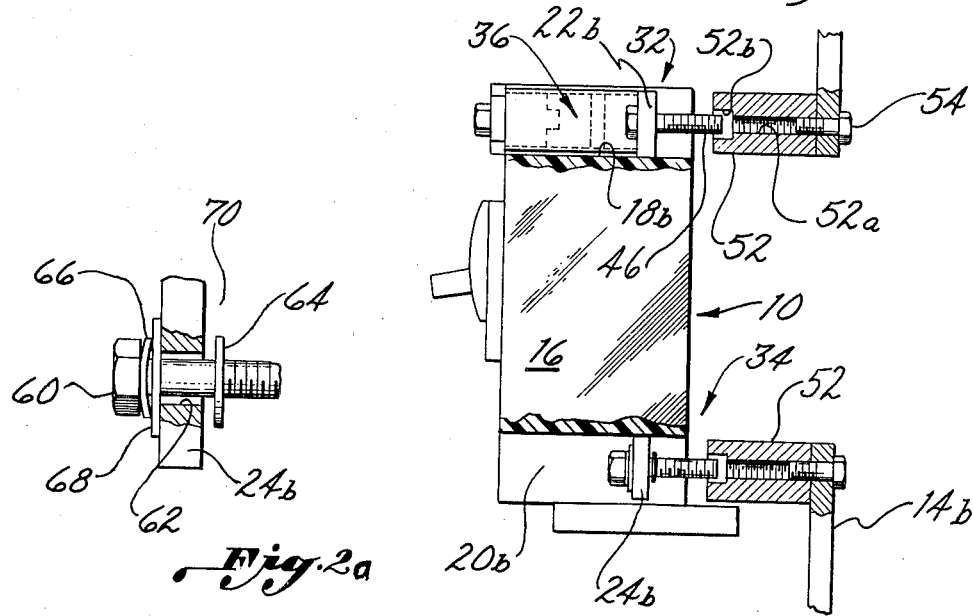
FIG. 2 is a side elevational view of the circuit interrupting device and switchboard parts of FIG. 1, partially broken away in the areas of the center pole line and load terminals of the device.

Still referring to FIG. 1, line terminals 22A and 22C for the outer poles, i.e., the A and C phases, are equipped with plug-in male stabs 26 secured by bolts 28. The A and C phase load terminals are similarly equipped with male stabs 26; only the stab secured to the C phase load terminal appearing in FIG. 1. A and C phase line and load bus bars each carry female stabs 30 positioned for mating electrical engagement with the male stabs 26 upon plug-in installation of circuit breaker 10. It will be appreciated that the stab connector parts 26 and 30 may take other forms from that shown in FIG. 1 and that the positions of the male and female parts may be reversed.

The mechanical assists, in the illustrated embodiment of the invention are incorporated in the center pole of B phase line and load terminal connections of circuit breaker 10 to the bus terminals of the switchboard. It will be appreciated that the mechanical assists may be incorporated in outside line and load terminals if skewing of the circuit breaker during mechanically assisted plug-in and unplugging movement of the circuit breaker relative to the switchboard can be tolerated or otherwise avoided. It is also conceivable that the instant invention could be practiced utilizing a single mechanical assist incorporated in a single line or load terminal connection, again if skew can be tolerated or otherwise avoided.

In accordance with an important feature of the present invention, the line terminal mechanical assist, generally indicated at 32 in FIG. 2, is structured to provide electrical isolation between the operator and line terminal 22B, thus permitting the operation thereof in relative safety while the switchboard, particularly B phase line bus bar 12B, is live. The load terminal mechanical assist generally indicated at 34 in FIG. 2, is preferably structured without electrical isolation, since the load terminal 24B can be readily de-energized by switching circuit breaker 10 to its "off" condition and thus manipulative operation of this assist can be safely performed while the switchboard is live. It will be appreciated that the load terminal assist may be constructed identically to assist 32 for an extra measure of safety. Alternatively the line terminal assist may be constructed like assist 34, if de-energizing the switchboard is not inconvenient.

Mechanical assist 32 includes a torque coupling assembly, generally indicated at 36 in FIG. 2, which consists of, as best seen in FIG. 3, a metallic actuator couple 38, a bolt couple 40 and an intervening insulative couple 42. These couples are inserted end-to-end in an insulative plastic sleeve 44, which is then heat-shrunk to maintain the couples in coaxial assembly. The couples are formed with interfitting tongues and grooves so as to be rotatably interconnected. Thus, as seen in FIG. 3, insulative couple 42 is formed at one end with a tongue 42a which is received in a groove 38a formed in one end of actuator couple 38. The other end of insulative couple 48 is formed with a groove 48b which receives a tongue 40a formed on one end of bolt couple 40. Preferably, the tongue and groove coupling between couples 38 and 42 is misaligned by 90° with the tongue and groove coupling between couples 38 and 42 in order to improve the torque coupling capacity of the insulative couple, which may be formed of any number of known high-strength plastic materials.

The other end of actuator couple 38 from groove 38a is machined down or otherwise provided with a bolt head configuration 38b spaced from the couple body by an annular shoulder 38c The other end of bolt couple 40 from torque 40a is formed with a suitable socket for drivingly engaging the head of a bolt 46 passing freely through an aperture 48 in the center pole line terminal 22B of circuit breaker 10. It is found that adequate driving connection with bolt 46 can be obtained by engaging its head in a simple groove 40b formed in the end of bolt couple 40.

As seen in FIGS. 1 and 2, assembly 36 is accommodated in line terminal recess 18B with the shank of bolt 46 passing through aperture 48 in the line terminal 22B and its head engaged in groove 40b of bolt couple 40. The assembly 36 is held captive by a plate 50 secured to the breaker case 16 across the front end of terminal recess 18B by screws 50a. Plate 50 is apertured at 50b to accommodate shoulder 38c and thus engages the body of the actuator couple 38 beyond this shoulder.

The torque coupling assembly 36 is thus captured between plate 50 and line terminal 22B to constrain endwise movement thereof relative to circuit breaker 10. It is noted that this endwise constraint does not impede rotational movement of assembly 36.

Still referring to FIGS. 1 and 2, B phase line bus bar 12B carries a connector 52, secured by suitable means such as a bolt 54. Connector 52 is formed having a threaded bore 52a which is countersunk to provide a recess 52b. Bore 52a is sized to receive the threaded shank of bolt 46. It is seen that rotation of the torque coupling assembly 36 in the direction to advance the shank of bolt 46 into bore 52a draws the circuit breaker 10 toward the line bus bars, thereby forcibly making the stab connections 26, 30. When bolt 46 is torqued up tight, a reliable bolted joint is achieved between line terminal 22B and connector 52 incident to completing the stab connections for the line terminals of the outer poles. To disengage the circuit breaker, the torque coupling assembly is rotated in the opposite direction to back the shank of the bolt 46 out of bore 52a, thereby forcibly withdrawing the circuit breaker from the switchboard. It is appreciated that, by virtue of the electric discontinuity afforded by the insulative coupler 42, the bolt headed portion 38b of actuator 38 may be manipulated by an electrician using a conventional socket wrench without danger of electrocution, even while the line bus is live.

Mechanical assist 34, though differently constructed, operates on the same principle as assist 32, described in detail above. As best seen in FIG. 2, a bolt 60 passes freely through an aperture 62 in load terminal 24B and is constrained against endwise movement relative to the circuit breaker by the bolt head on one side of the load terminal and on the other side by a snap ring 64 accommodated in a groove formed in the bolt shank. A spring washer 66 and a washer 70 is disposed between snap ring 64 and load terminal 24B. Load bus bar 14B carries a connector 52, secured thereto by bolt 54. It is thus seen that rotation of bolt 60 advancing its shank into threaded bore 52a of connector 52 draws the circuit breaker toward the switchboard to forcibly make the load terminal stab connections. In order not to interfere with the making of the bolted joint at the center pole load terminal, the recess 52b in connector 52 is dimensioned to accept snap ring 64 as the end of the connector and is clamped in positive electrical connection with load terminal 24B via washer 70. Rotation of bolt 60 in the opposite direction forcibly withdraws the circuit breaker, thereby disengaging the load terminal stab connections. With the circuit breaker in the off condition, the bolt 60 can be safely manipulated using a conventional socket wrench without de-energizing the switchboard.

If desired, especially in the case of large circuit breakers, a shelf 75 (FIG. 1) may be mounted to the switchboard frame (not shown) to support the circuit breaker at least during the initial mounting stage and the final dismounting stage.

While the instant invention is illustrated as being utilized in conjunction with a three-pole electrical device, it will be appreciated that the teachings herein are applicable to electrical devices having any number of poles or terminals. It will also be appreciated that the positions of the bolt and the connector 52 may be reversed without departing from the invention.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Apparatus for mechanically assisting the installation and removal of an electrical device with respect to a piece of electrical equipment, at least one set of associated device and equipment terminals being equipped with stab connector parts for plug-in electrical interengagement; said apparatus comprising, in combination:
   A. first and second threadedly engageable parts;
   B. at least one remaining device terminal unequipped with a stab connector part;
   C. means retaining said first part in operative, registered relation with said remaining device terminal, said retaining means acommodating rotational motion of said part while limiting movement thereof relative to the device in the directions of movement of the device during installation and removal with respect to the electrical equipment;
   D. at least one remaining equipment terminal associated with said remaining device terminal and likewise unequipped with a stab connector part; and
   E. means fixedly mounting said second part to the electrical equipment in electrical connection with said remaining equipment terminal;
   F. whereby, with said parts threadedly engaged, rotation of said first part in one direction forcibly draws the device toward the electrical equipment to electrically engage the associated stab connector parts, said parts also ultimately clamping said remaining device terminal in electrical connection with said remaining equipment terminal, and rotation of said first part in the opposite direction forcibly withdraws the device from the equipment to disengage the associated stab connector parts.

2. The apparatus defined in claim 1, wherein the electrical device and the equipment have plural associated line and load terminals, and at least one set of associated line terminals and one set of associated load terminals each being equipped with said first and second parts to assist in the plug-in engagement and disengagement of the stab connector parts carried by the other device and equipment line and load terminals.

3. The apparatus defined in claim 2, wherein the electrical device is a three pole device having three line and three load terminals for electrical connection with associated line and load terminals of the switchboard, the associated center pole line and load terminals each being equipped with said first and second parts.

4. The apparatus defined in claim 1, wherein said first part is in the form of a headed bolt accommodated in an aperture in said remaining device terminal and said second part is in the form of a connector having a threaded bore receiving said bolt.

5. The apparatus defined in claim 4, wherein said retaining means includes a snap ring engaging the shank of said bolt on the side of said remaining device terminal opposite from the bolt head.

6. The apparatus defined in claim 5, wherein said threaded bore is countersunk to form a recess in said connector accommodating said snap ring.

7. The apparatus defined in claim 1, wherein said first part includes insulative torque coupling means electrically isolating an operator from the equipment while rotating said first part.

8. The apparatus defined in claim 1, wherein said first part includes a bolt passing through an aperture in said remaining device terminal and an insulative torque coupling means including a bolt couple in rotational driving engagement with said bolt, an actuator couple for engagement by a wrench and an electrically insulative couple rotatably interconnecting said bolt and actuator couples.

9. The apparatus defined in claim 8, wherein said couples are held in coaxial assembly by an insulative sleeve.

10. The apparatus defined in claim 8, wherein said retaining means includes a plate secured to the device to capture said torque coupling means and the head of said bolt between it and said remaining device terminal.

11. A multi-pole electrical device adapted for mechanically assisted installation in an electrical switchboard, said device comprising, in combination:
 A. a plurality of line terminals for electrical connection with corresponding line terminals of the switchboard;
 B. a like plurality of line terminal connectors,
  1. at least one of said line terminal connectors including a first part equipped for threaded engagement with a connector part fixedly mounted by a switchboard line terminal to effect a bolted electrical connection with the corresponding one device line terminal,
  2. the remaining line terminal connectors being stabs carried by the remaining device line terminals for plug-in electrical engagement with stab connectors mounted by the corresponding switchboard line terminals;
 C. first means retaining said first part in operative relation with said one device line terminal while accommodating rotational movement of said first part and constraining movement thereof relative to the device in the directions of movement of the device with respect to the switchboard incident to installation and removal;
 D. a plurality of load terminals for electrical connection with corresponding switchboard load terminals;
 E. a like plurality of load terminal connectors,
  1. at least one of said load terminal connectors including a second part equipped for threaded engagement with a connector part fixedly mounted by a switchboard load terminal to effect a bolted electrical connection with the corresponding one device load terminal,
  2. the remaining load terminal connectors being stabs carried by the remaining device load terminals for plug-in electrical engagement with stab connectors mounted by the corresponding switchboard load terminals,
 F. second means retaining said second part in operative relation with said one device load terminal while accommodating rotational movement of said second part and constraining movement thereof relative to the device in the directions of movement of the device with respect to the switchboard incident to installation and removal;
 G. whereby, with said first and second parts threadedly engaging their associated switchboard connector parts, rotation of said parts in one direction forcibly draws the device toward the switchboard to electrically engage the corresponding stabs and clamp said one device line and load terminals, and rotation of said parts in the opposite direction forcibly withdraws the device from the switchboard to disengage the stabs.

12. The device defined in claim 11 is a three pole device having three line and load terminals, said first and second parts being respectively retained in operative relation with the center pole line and load terminals.

13. The device defined in claim 11, wherein said first part includes a bolt accommodated in an aperture in said one device line terminal for threaded engagement in a tapped bore formed in the associated switchboard connector part and an insulative torque coupling assembly engaging the head of said bolt while electrically isolating an operator therefrom.

14. The device defined in claim 13, wherein said torque coupling assembly includes a bolt couple engaging said bolt head, an actuator couple adapted for engagement by a wrench and an electrically insulative couple rotatably interconnecting said bolt and actuator couples.

15. The device defined in claim 14, wherein said first retaining means includes a plate secured to the device to capture said torque assembly and said bolt head between it and said one device line terminal.

16. The device defined in claim 13, wherein said second part includes a bolt accommodated in an aperture in said one device load terminal for threaded engagement in a tapped bore formed in the associated switchboard connector part and said second retaining means includes a snap ring engaging the shank of said bolt to capture said one device load terminal between it and the head of said bolt.

* * * * *